United States Patent [19]

Weller

[11] Patent Number: 4,753,007
[45] Date of Patent: Jun. 28, 1988

[54] CUTTING TOOL FOR SHIELDED CABLE

[75] Inventor: Peter A. Weller, Rockford, Ill.

[73] Assignee: Contractor Tool and Equipment Textron Inc., Rockford, Ill.

[21] Appl. No.: 901,111

[22] Filed: Aug. 28, 1986

[51] Int. Cl.$^4$ ............................................. B21F 13/00
[52] U.S. Cl. ..................................... 30/90.3; 30/90.8
[58] Field of Search ...................... 30/90.1, 90.3, 90.8, 30/91.2; 188/82.7, 82.74, 65.1, 67

[56] References Cited

U.S. PATENT DOCUMENTS

| 674,215 | 5/1901 | Palser et al. | 188/67 |
| 2,674,027 | 4/1954 | Kosinski | 30/90.3 |
| 3,851,387 | 12/1974 | Ducret | 30/90.3 |
| 4,359,819 | 11/1982 | Ducret | 30/90.3 |

FOREIGN PATENT DOCUMENTS 60327  7/1925  Sweden ................................ 188/65

Primary Examiner—E. R. Kazenske
Assistant Examiner—Eugenia A. Jones
Attorney, Agent, or Firm—Lackenbach, Siegel, Marzullo & Aronson

[57] ABSTRACT

The cutting tool includes a tool body having a longitudinal channel to receive different sizes (outer diameters) of shielded cable for cutting and a cutter arm movably mounted on the body to bring a rotatable cutter blade into the channel to cut the shielding. A transverse adjusting member is mounted on the tool body for movement toward or away from the channel to adjustably position a pivotable cable clamp detent in the channel and includes a biasing spring that allows pivotable deflection of the clamp detent toward one end of the channel when the cable is inserted from the other end and return of the clamp detent to a cable clamp position when the cable is moved slightly in the opposite direction to prevent cable movement as a result of cutting forces. Movement of the adjusting member controls the adjusted position of the clamp detent in the channel and means is provided on the adjusting member to releasably lock same for a particular size of shielded cable to be cut.

10 Claims, 4 Drawing Sheets

CUTTING TOOL FOR SHIELDED CABLE

FIELD OF THE INVENTION

The invention relates to a tool for cutting the shielding of a shielded conduit such as BX cable, Greenfield conduit and the like.

BACKGROUND OF THE INVENTION

Various types of cutting tools have been used in the past to sever the metallic shielding or armor of shielded cable or conduit during installation.

The Kosinski U.S. Pat. No. 2,674,027 issued Apr. 6, 1954, illustrates a cutting tool for such cable having a cutter carried on a lever arm and a channel in which BX cable is received and held in place during cutting by engagement of a threaded set screw with the bottom of the cable.

A similar cutting tool is disclosed in the Ducret U.S. Pat. No. 3,851,387 issued Dec. 3, 1974.

Ducret U.S. Pat. No. 4,359,819 issued Nov. 23, 1982, discloses a cutting tool like that described in U.S. Pat. No 3,851,387 with the addition of a third hinged handle carrying a cable clamp member.

The Ducret U.S. Pat. No. 4,142,290 issued Mar. 6, 1979, shows a motorized cutting tool for cutting shielded conduit or cable.

Still other cutting tool constructions are shown in the Eck, et al U.S. Pat. No. 2,031,470 issued Feb. 18, 1936; the Underhill U.S. Pat. No. 2,551,401 issued May 1, 1951; the Schleimer U.S. Pat. No. 2,654,941 issued Oct. 13, 1953; and the Perry U.S. Pat. No. 3,453,917 issued July 8, 1969.

SUMMARY OF THE INVENTION

The invention contemplates a cutting tool for shielded or armored cable or conduit in which a range of cable/conduit sizes can be accommodated and cut.

To this end, the invention involves a cutting tool having a tool body with an elongate longitudinal channel to receive different sizes of cable and a cutting arm movably disposed and carrying a rotatable cutter blade that extends into the channel when the arm is moved toward the tool body.

The tool body includes a cable clamp member extending into the channel and adjustable in position in the channel to contact and clamp different sizes of cable to be cut. The clamp member is pivotably carried on a transverse adjusting member movably mounted on the tool body for movement toward and away from the channel and lockable in adjusted position. Also carried on the adjusting member is a spring biasing the clamp member to allow pivoting thereof toward one end of the channel when a cable is inserted in the channel from the other opposite end and to snap back by spring action to a cable clamp position when the cable is positioned at a cutting position to clamp same against movement for cutting of the shielding. In the cable clamp position, the clamp member prevents movement of the cable from cutting forces exerted thereon tending to move the cable toward the opposite end of the channel and yet can pivot toward the other end when another cable is inserted from that opposite end. The clamp member, spring and transverse adjusting member move as a unit on the tool body during initial adjustment of the clamp member in the channel.

Preferably, the transverse adjusting member comprises a bushing portion on which the clamp member is pivotably disposed and a threaded portion extending past a side of the tool body and threaded into a knob. When the knob is rotated on the threaded portion, the inner surface of the knob engages a friction washer against the side of the tool body to lock the adjusted position.

The cutting arm includes an aperture through which the blade projects into the channel when the arm is moved toward the tool body.

The cutter blade is rotatable on a spindle projecting transversely from a side of the cutting arm and connected to the crank arm. The degree of projection of the blade into the channel is adjustably controlled for different sizes of cable or conduit by an adjusting collar on the spindle. The adjusting collar includes multiple adjusting surfaces and is indexable on the spindle to place the desired adjusting surface to contact a stop on the tool body when the cutting arm is moved to the cutting position.

BEST MODE FOR CARRYING OUT THE INVENTION

Figure 1:
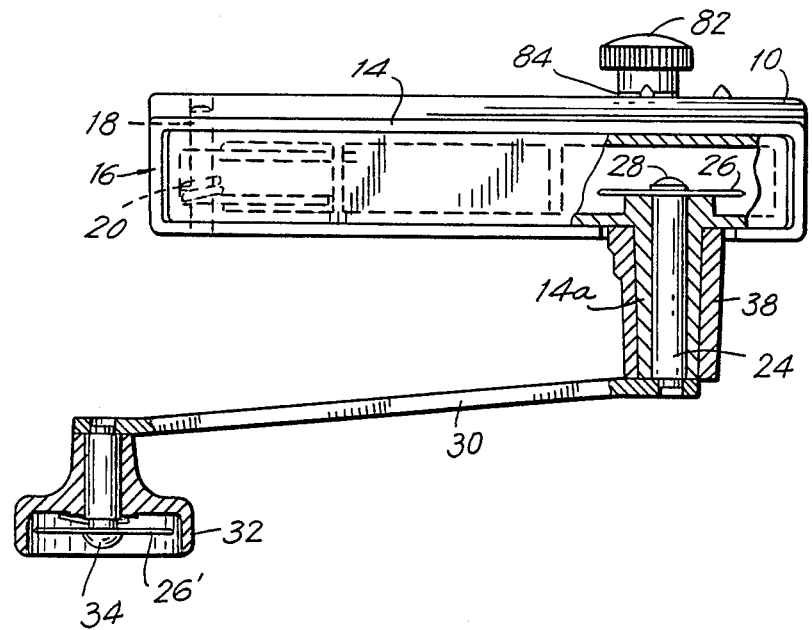
FIG. 1 is a plan view of the cutting tool with fragments in cross-section.

The Figures illustrate a cutting tool constructed in accordance with the invention to have a tool body 10 with an elongate longitudinally extending channel 12 formed therein to receive different sizes (outer diameters) $S1$, $S2$, $S3$, of shielded cable or conduit such as BX cable, Greenfield conduit (hereinafter together referred to as "shielded cable") and a cutter arm 14 pivotally connected at one end 16 (rear end) to the tool body by transverse pin 18. A coil spring 20 around the pin 18 tends to bias the cutter arm away from the tool body (position shown in phantom).

Carried on the other end 22 (front end) of the cutter arm on a rotatable spindle 24 is a cutter blade 26. A screw 28 holds the blade to the end of the spindle as shown. The spindle 24 is rotatable in transverse projection 14a on the cutter arm and is connected at its outermost end to a crank arm 30 having a knob 32 for manual rotation of the crank to effect cutting. Carried in the knob is a spare cutter blade 26' fastened in knob by screw 34.

Figure 3:
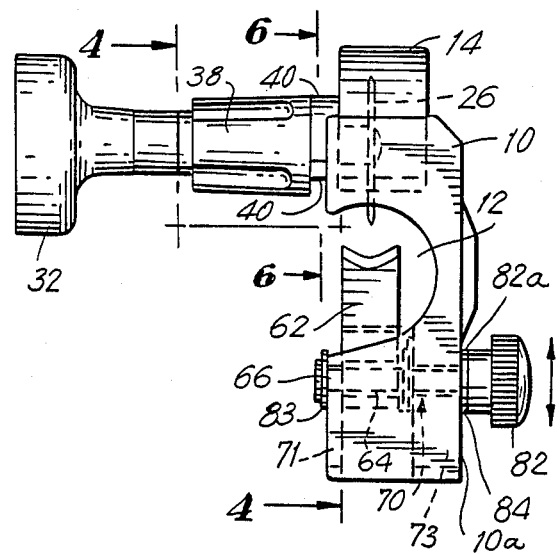
FIG. 3 is an end elevation of the cutting tool.

For cutting, the cutter arm 14 is pivoted toward the tool body 10 to position the cutter blade 26 in the channel 12. The extent to which the blade extends into channel 12 is controlled by an adjusting collar 38 mounted on projection 14a for rotatable indexing to place one of multiple adjusting surfaces 40 in a downwardly facing relation to stop 42 at the bottom of the U-shaped slot 43 in the tool body 10. As shown, the adjusting surfaces 40 are located at different radii from the longitudinal axis of the adjusting collar and spindle 24 so that control of the amount of cutter blade extension into channel 12 through slot 43 in the tool body is provided. When the cutter arm is pivoted toward the tool body, as shown in FIG. 3, the projection 14a has multiple external indexing bumps 44 to engage multiple indexing recesses 46 to cooperate with the indexing bumps to provide convenient selection and retention of the desired blade extension into channel 12 by rotational indexing of collar 38.

As mentioned, tool body 10 includes elongate longitudinal channel 12 to receive different sizes of shielded cable. As is apparent, the channel is formed of a single radius R to form a cylindrical channel with an open side 50. The channel has a rear end 52 into which shielded cable to be cut is inserted and a forward end 54.

Figure 2:
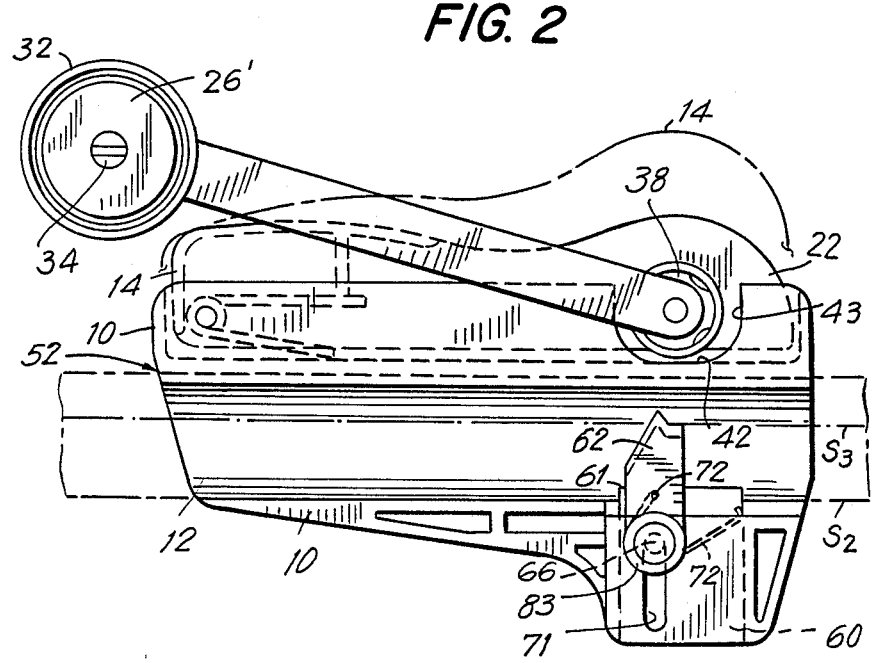
FIG. 2 is a side elevation of the cutting tool.
Figure 4:
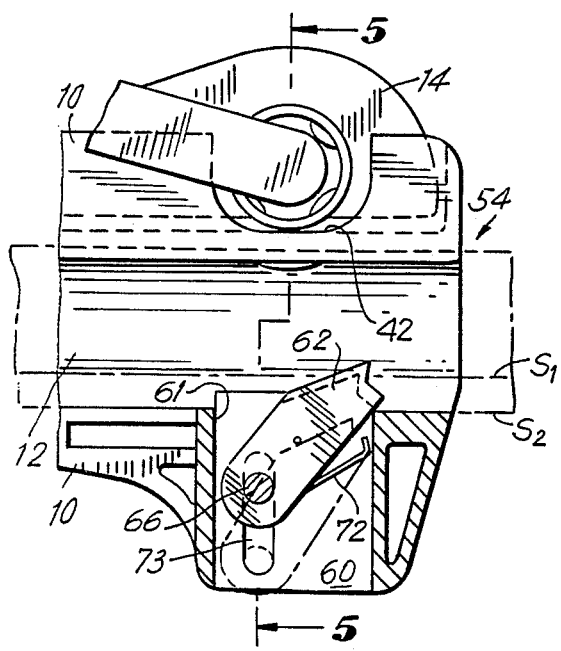
FIG. 4 is an enlarged fragmentary side elevation of the clamp member in different positions to clamp different O.D. cable.
Figure 5:
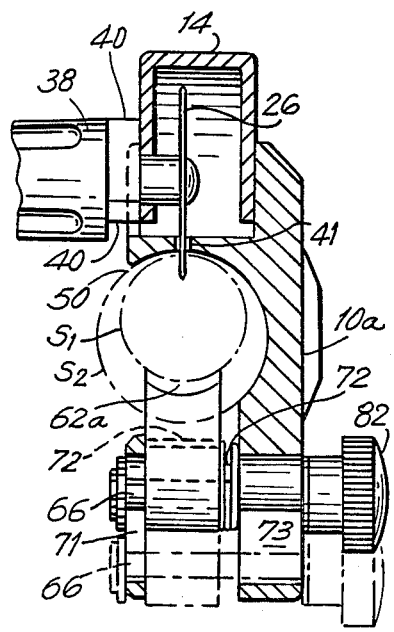
FIG. 5 is an end elevation of FIG. 4 showing the cable clamp in the two different positions.

Tool body 10 includes the slot 41 in the channel 12 on the side thereof adjacent cutter arm 14 to receive the cutter blade 26 and also includes a longer slot 60 in the channel on the opposite side thereof from slot 41. Slot 60 intersects with channel 12 and houses a cable clamp member or detent 62 pivotably carried on a bushing 64 on shaft 66 of transverse adjusting member 70 which shaft extends through slots 71, 73 transversably, preferably perpendicularly, to channel 12. Also carried on shaft 66 is a V-shaped spring 72 which tends to bias the clamp detent 62 in the upright clamping position shown in FIG. 2. However, the spring 72 allows the clamp detent 62 to be rotated forwardly (clockwise) about bushing 64 and shaft portion 66 toward the front end of the channel when shielded cable to be cut is inserted from the rear end of the channel, FIG. 4. Once the shielded cable is in approximate cutting position; i.e., with the portion to be cut aligned just foward past the cutter blade, the operator pulls the cable backward slightly to position the cable at a cutting position with the portion to be cut opposite blade 26 and to cause the bias of spring 72 to return the clamp detent 62 to an upright position with its arcuate concave recess 62a engaged in a convolution on the shielding of the shielded cable as shown in FIG. 2 for cable size S3 to lock cable in position for cutting. Since the cutter blade rotates clockwise for cutting, cutting forces on the cable in the channel 12 tend to force the cable toward the rear end of the channel. However, the clamp detent 62 substantially prevents movement in that direction by virtue of its engaging the rear wall 61 of slot 60 to hold the cable in position during cutting.

Figure 7:
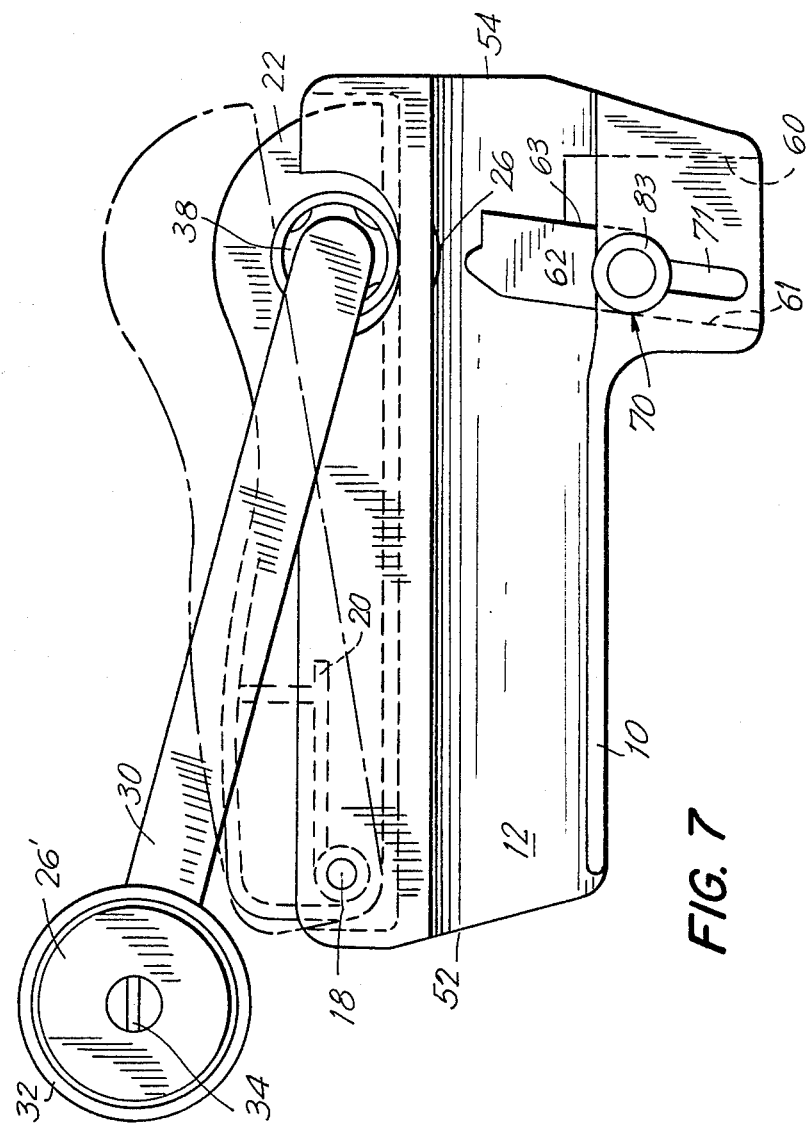
FIG. 7 is a view similar to FIG. 2 showing a preferred embodiment of the invention.

In a preferred embodiment shown in FIG. 7, the rear wall 61 and fore wall 63 of slot 60 are inclined forwardly at an angle to vertical to provide aft and fore adjustment of the detent travel as it is adjusted up and down in slot 60 to accommodate the fact that the convolutions of different size cable are themselves different in size. Detent 62 on shaft 66 moves along a forwardly inclined path as well.

Figure 8:
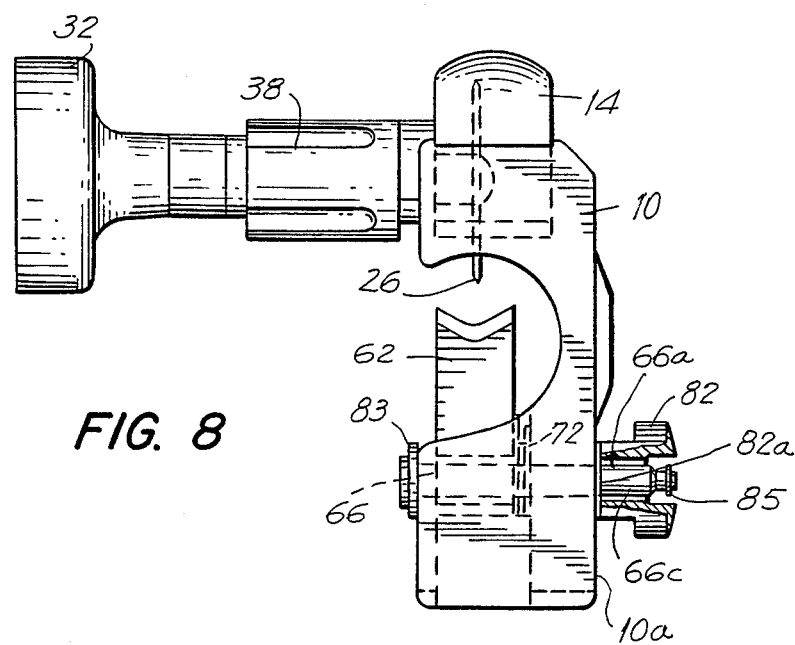
FIG. 8 is a view similar to FIG. 5 showing more detail of the transverse adjusting member.
Figure 6:
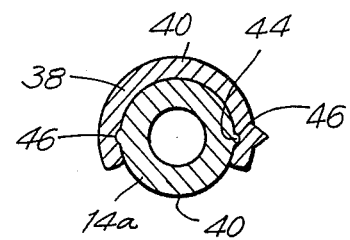
FIG. 6 is a sectional view along line 6—6 of FIG. 3.

Adjustment of the clamp detent 62 within the channel 12; i.e., its extension into the channel, is effected by moving transverse adjusting member 70 toward or away from channel 12 in slot 60 and then releasably locking the adjusted position. To this end, the adjusting member includes the shaft 66 residing in smaller transverse slot 73 and extending past side 10a of the tool body and terminating in a manual adjustment knob 82. Between the knob 82 and side 10a is a friction washer 84. End 66a of shaft 66 includes a threaded portion 66c threadably received in threaded internal bore of the knob 82. A snap-ring 85 on a reduced end of shaft 66 and in a slot in the knob head holds knob 82 on the shaft, see FIG. 8. The adjusting member includes a head or washer 83 engaging the opposite side of the tool body from side 10a.

To effect adjustment of the clamp detent in channel 12, the knob 82 is rotated to release pressure on friction washer 84 to allow movement of adjusting member 70 toward or away from the channel 12 in slot 60 to clamp against a piece of cable therein to be cut. Once the adjusted position is achieved, it is releasably retained by rotating knob 82 in a direction to engage the friction washer 84 tightly between side 10a of the tool body and inner surface 82a of the knob. Thereafter, different pieces of the same size cable can be cut without having to adjust the clamp member since the adjusted position thereof is releasably locked.

After adjustment, the operator inserts the next shielded cable to be cut through the rear end of the channel 12 to position the cable location to be at just slightly in front of the cutter blade and then pulls the cable rearwardly to a cutting position and to return the deflected clamp detent to its upright cable clamping position. The adjusting collar 38 is indexed to the desired position on the spindle 24 to provide sufficient blade penetration of the shielding of the clamped cable to sever the shielding but insufficient penetration to cut the electrical wires or cable inside the shielding. Cutting is effected by holding the cutter arm toward the tool body to engage the selected adjusting surface 40 against the stop on the tool body and by rotating the crank arm 30 clockwise. As mentioned, the cutting forces on the clamped shielded cable would tend to push it from the cutting position toward the rear end of channel except that the clamp detent 62 is prohibited from movement in that direction and thereby also prevents similar cable movement during cutting.

While certain preferred embodiments of the invention have been described in detail above, those familiar with the art will recognize that various modifications can be made therein for practicing the invention as defined by the following claims:

We claim:

1. A cutting tool for cutting the shielding of shielded cable, comprising:

a tool body having an elongate longitudinal channel for receiving a cable to be cut;

a cutting arm movably positioned on said tool body;

a rotatable cutter blade, said blade being mounted to said cutting arm, said blade extending into said channel when said cutting arm is moved toward said tool body;

an adjusting member mounted to said body, said adjusting member being movable on said body toward and away from said channel;

a cable clamp member pivotably mounted to said adjusting member, said clamp member extending into said channel to a selectable depth, said depth being selectable by rectilinear movement of said adjusting member relative to said channel to accommodate different sizes of cable;

a spring biasing said clamp member toward one end of said channel, said clamp member being subject to pivoting away from said one end toward the opposite end of said channel by a cable insert in said channel, said tool body including stop means that prevent movement of the clamp member when said clamp member is urged toward said one end; and means for adjustably locking the position of said adjustment member relative to said channel.

2. The cutting tool of claim 1 wherein the cutting arm includes a transverse spindle on which the cutter blade is mounted and a crank arm for rotating the spindle.

3. The cutting tool of claim 1 wherein the adjusting member, cable clamp member and spring are disposed in a slot in the tool body extending into intersection with the channel at a location generally opposite the location where the cutter blade extends into the channel.

4. The cutting tool of claim 1 wherein the means for locking the position of the clamp member is carried on the adjusting member so as to releasably lock its position.

5. The cutting tool of claim 1 and further comprising a knob and wherein the transverse adjusting member includes a bushing portion on which the clamp member is pivotably carried and a threaded portion passing through a slot of the tool body, said knob threadably engaging said threaded portion to adjustably lock the position of said clamp member by (its position upon) threadably tightening the knob against said body.

6. The cutting tool of claim 3 wherein the adjusting member includes a knob located adjacent a side of the tool body and wherein a friction washer is positioned between the knob and side on the tool body and against which the knob is tightened to releasably lock the position of the clamp member.

7. The cutting tool of claim 1 wherein the rotatable cutter tends to move the cable in the channel toward said one channel end during cutting and wherein said stop means prevents pivoting movement of the clamp member toward said one end of said channel to clamp the cable, said clamp member freely pivoting towards said opposite end of said channel.

8. The cutting tool of claim 7 wherein said stop means for preventing pivoting movement includes a wall that abuts the clamp member when said clamp member is urged towards said one end to prevent movement of the cable because of cutting forces.

9. The cutting tool of claim 8 wherein said wall comprises a wall forming a slot in the tool body in which slot the clamp member is disposed.

10. The cutting tool of claim 2 and further comprising a collar mounted on said spindle, said collar being indexable thereon, the periphery of said collar having surface portions at different radial distances from the rotational axis of said spindle, and a stop on the tool body, said peripheral surface portions being selectably positionable against said stop by indexing said collar on said spindle, extension of said cutter blade into said channel being adjustably controllable by said indexing.

* * * * *